United States Patent [19]
Lai

[11] Patent Number: 5,833,534
[45] Date of Patent: Nov. 10, 1998

[54] FLASH-LIGHT AND ELECTRIC FAN MOUNTED ONTO A BICYCLE

[75] Inventor: Tzay-Shyong Lai, Chiayi, Taiwan

[73] Assignee: Dih-Bah Co., Ltd., Chiayi, Taiwan

[21] Appl. No.: 856,584

[22] Filed: May 15, 1997

[51] Int. Cl.[6] .................................................. B62J 6/00
[52] U.S. Cl. ............................ 362/72; 362/191; 416/55
[58] Field of Search .............................. 362/72, 396, 190, 362/191; 416/55; 340/432

[56] References Cited

U.S. PATENT DOCUMENTS

| | | | |
|---|---|---|---|
| 803,635 | 11/1905 | Stahlhut | 416/55 |
| 4,204,191 | 5/1980 | Daniels | 362/72 |
| 5,355,746 | 10/1994 | Lin | 362/72 |

*Primary Examiner*—Thomas M. Sember
*Attorney, Agent, or Firm*—Browdy and Neimark

[57] ABSTRACT

A flash light and electric fan in combination removably mounted onto the front tube of a bicycle by way of C-shaped light seat and fan seat to serve as a head light or be selectively attached to a removable gripping handle of a power supply device so as to be carried around as a flash light or a personal fan. The flash light and electric fan can be controlled separately by way of switches. The power supply device can be housed in a waist bag and the flash light or electric fan in connection to the power supply device can be carried around with ease for personal use.

2 Claims, 5 Drawing Sheets

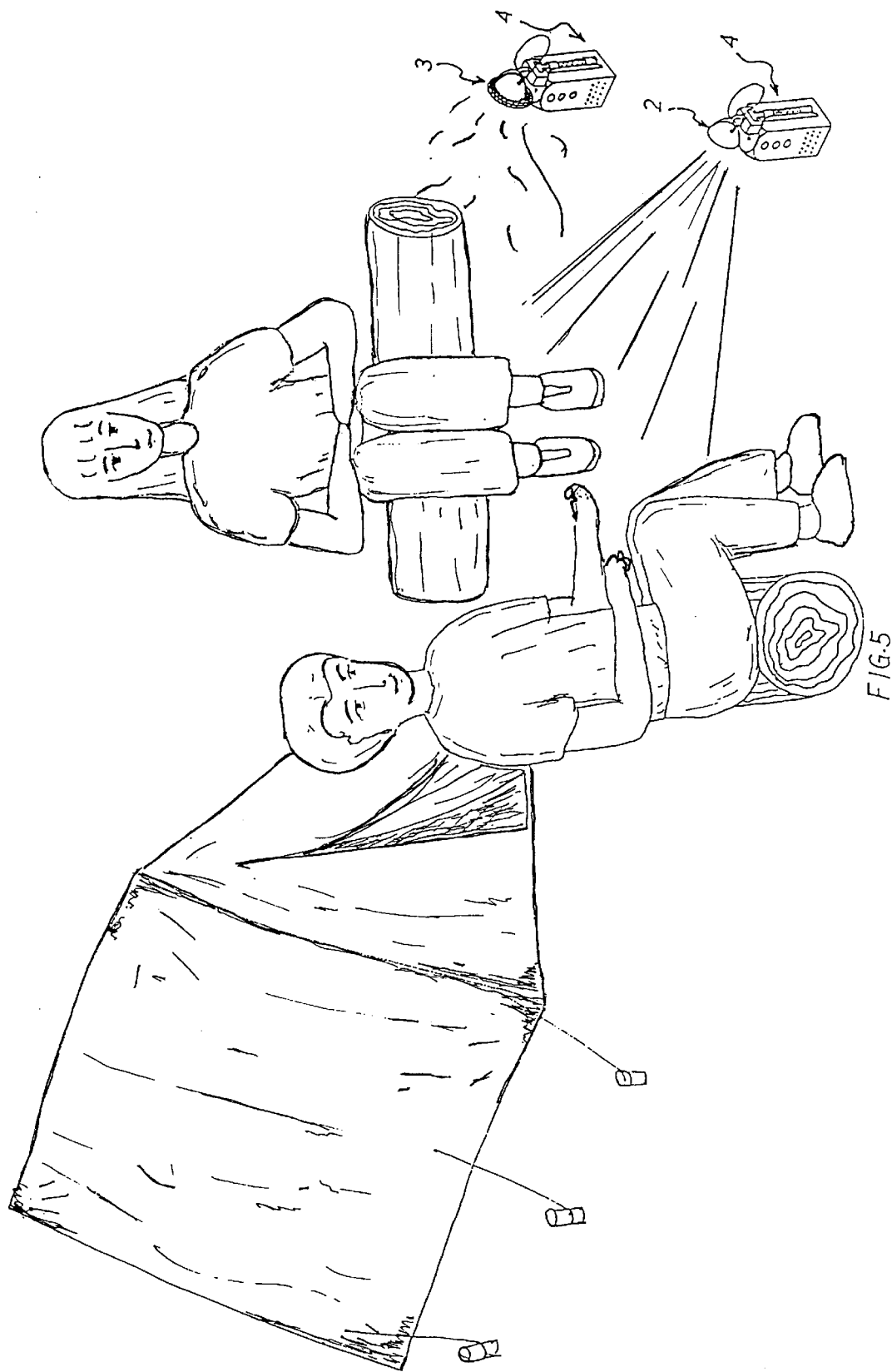

FLASH-LIGHT AND ELECTRIC FAN MOUNTED ONTO A BICYCLE

BACKGROUND OF THE INVENTION

The present invention relates to a flash light and electric fan in combination removably mounted onto the front tube of a bicycle by way of C-shaped light and fan seats to serve as a head light or be selectively attached to a removable gripping handle of the power supply device so as to permit the flash light or fan to be carried around as a flash light or a personal fan. The flash light and electric fan can be controlled separately by way of switches mounted onto the front tube of a bicycle.

Bicycles have been a very popular vehicle for transportation and sports for many years because they are relatively light in weight and small in size and can be carried around disposing on top of automobiles, and it seems indispensable in this aspect.

Many different kinds of design have been developed for bicycles to make them more appealing in appearance and more efficient in speeding. Stream-line appearance plus excellent mechanical functions attributes to the popularity of bicycles among consumers all over the world.

However, there are still many disadvantages in the design of current bicycles, given as follows:

1. Not a power supply device is provided on bicycles, there is no head light available in the dark, making it dangerous ride at night; although, a dynamo is used to generate electricity by friction against the wheel of a bicycle, but it is easily damaged when a bicycle is ridden too fast.

2. A fixed power supply device is secured to a bicycle and can not be dismantled and carried around, so its use is limited.

3. Bicycle riders sweat a lot when riding under the hot sun, and it is preferable to have an electric fan to cool them down, but no such device is available in the prior art.

SUMMARY OF THE INVENTION

Therefore, the primary object of the present invention is to provide a flash light and an electric fan assembly which are powered by a power supply device, and the flash light can serve as a head light and can also be used as a portable flash light when attached to the power supply device.

Another object of the present invention is to provide a flash light and an electric fan assembly wherein the fan can be easily removed from a bicycle and mounted onto a power supply device so as to be portably carried around for use in different places, such as a camping tent for good ventilation.

One further object of the present invention is to provide a flash light and an electric fan assembly wherein the flash light can be used an indoor emergency light.

BRIEF DESCRIPTION OF THE DRAWINGS

FIG. 1A is an enlarged front end view of the power supply 4 circled in FIG. 1.

FIG. 5 is another example of the application of the present invention on a camping site.

DETAILED DESCRIPTION OF THE PREFERRED EMBODIMENT

Figure 1:
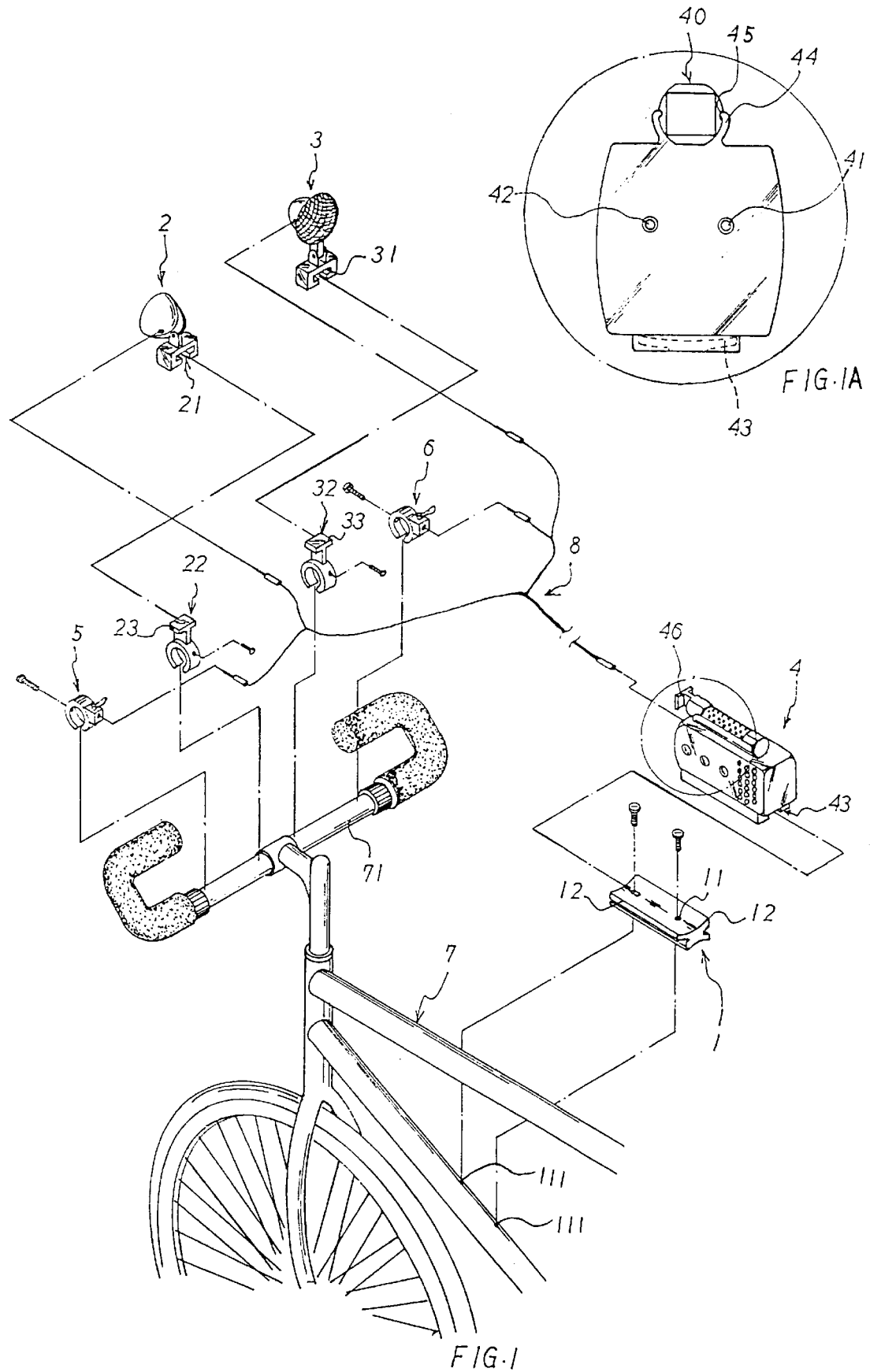
FIG. 1 is a perspective diagram showing the structure of the present invention.

Referring to FIG. 1 and FIG. 1A, the flash light and fan assembly of the present invention is comprised of a mounting seat 1, a flash light 2, an electric fan 3, a power supply device 4 and a light switch 5 and a fan switch 6.

The mounting seat 1 has two screw holes 11 in conformance to the corresponding holes 111 on the down tube of a bicycle so as to permit the mounting seat 1 to be secured to the down tube of the frame 7. The mounting seat 1 has two symmetric tracking protrusions 12.

The flash light 2 has a C-shaped engagement groove 21 defined at the bottom thereof, The groove 21 is defined in conformance to a T-shaped track extension 23 of a light seat 22 secured to the front tube 71 of the bicycle.

The electric fan 3 has a C-shaped engagement groove 31 defined at the bottom thereof and in conformance to a T-shaped track extension 33 of a fan seat 32.

The power supply device 4 is a rechargeable battery having a charging socket 41 and a power supply socket 42 and has an engagement groove 43 defined in conformance to the tracking protrusions 12 of the mounting seat 1 at the bottom side thereof. A retaining groove 44 is disposed at the top of the power supply device 4 so as to permit a gripping handle 40 having a notch 45 defined at each longitudinal side thereof to be retained in engagement with the retaining groove 44. At the top end of the gripping handle 40 is provided with a T-shaped track means 46.

In assembly, the mounting seat 1 is fixed to the down tube of the frame 7 by screws 11 led through the two screw holes 11 of the mounting seat 1 and the corresponding holes 111 on the down tube of the bicycle. Then, the power supply device 4 is attached to the mounting seat 1 by engaging the tracking protrusions 12 of the mounting seat 1 with the engagement groove 43.

On the front tube 71 of the bicycle are disposed the light seat 22, the fan seat 32 and the light switch 5 and the fan switch 6. The flash light 2 is mounted onto the light seat 22 by engaging the T-shaped track extension 23 of the light seat 22 with the groove 21 of the flash light 2; and the electric fan 3 is secured to the fan seat 32 by engaging the T-shaped track extension 33 of the fan seat 32 with the groove 31 of the fan 3.

Figure 2:
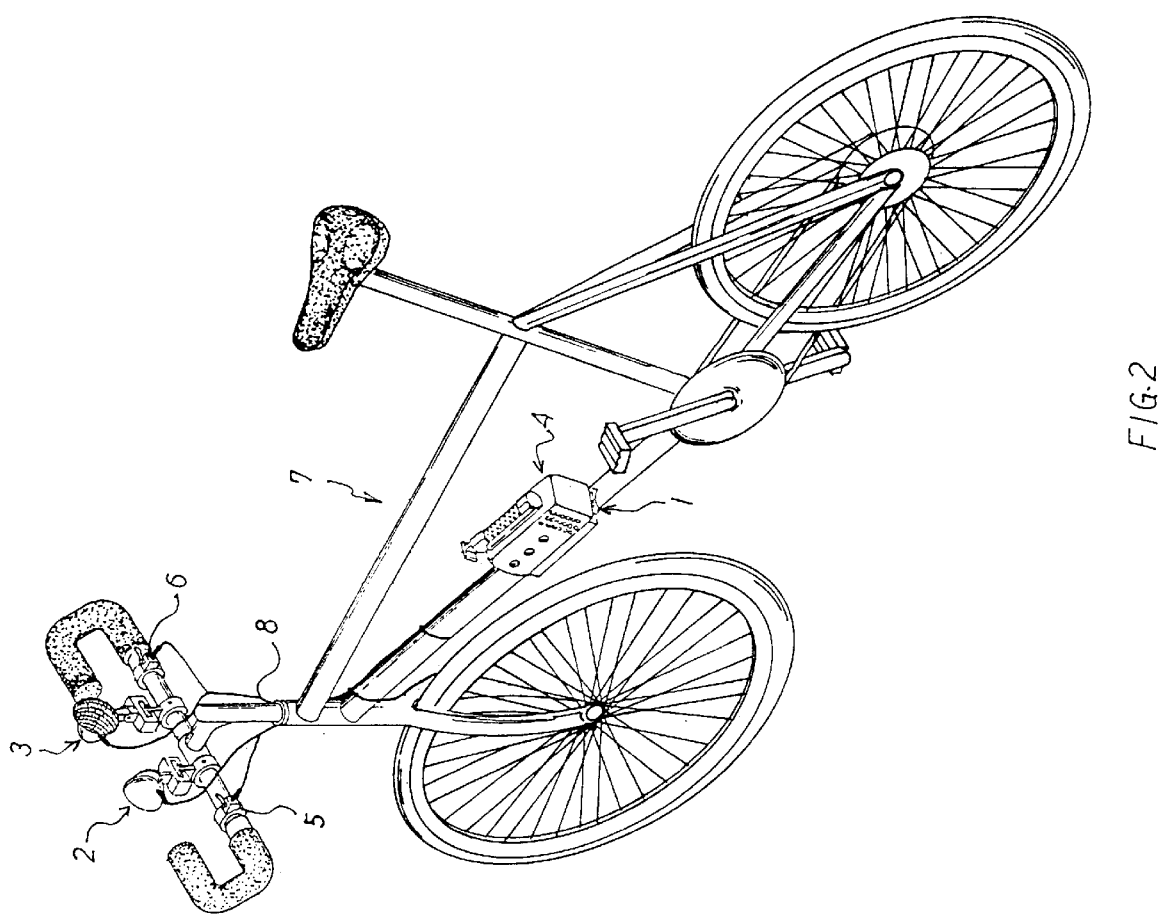
FIG. 2 is a diagram showing the application of the present invention to a bicycle.

An electric wire 8 having multiple terminals in connection to the flash light 2, the light switch 5, the electric fan 3 and the fan switch 6 is coupled to the power supply socket 42 of the power supply device 4, as shown in FIG. 2 so as to permit the flash light 2 and the electric fan 3 to be indepently or simultaneously operated.

Figure 3:
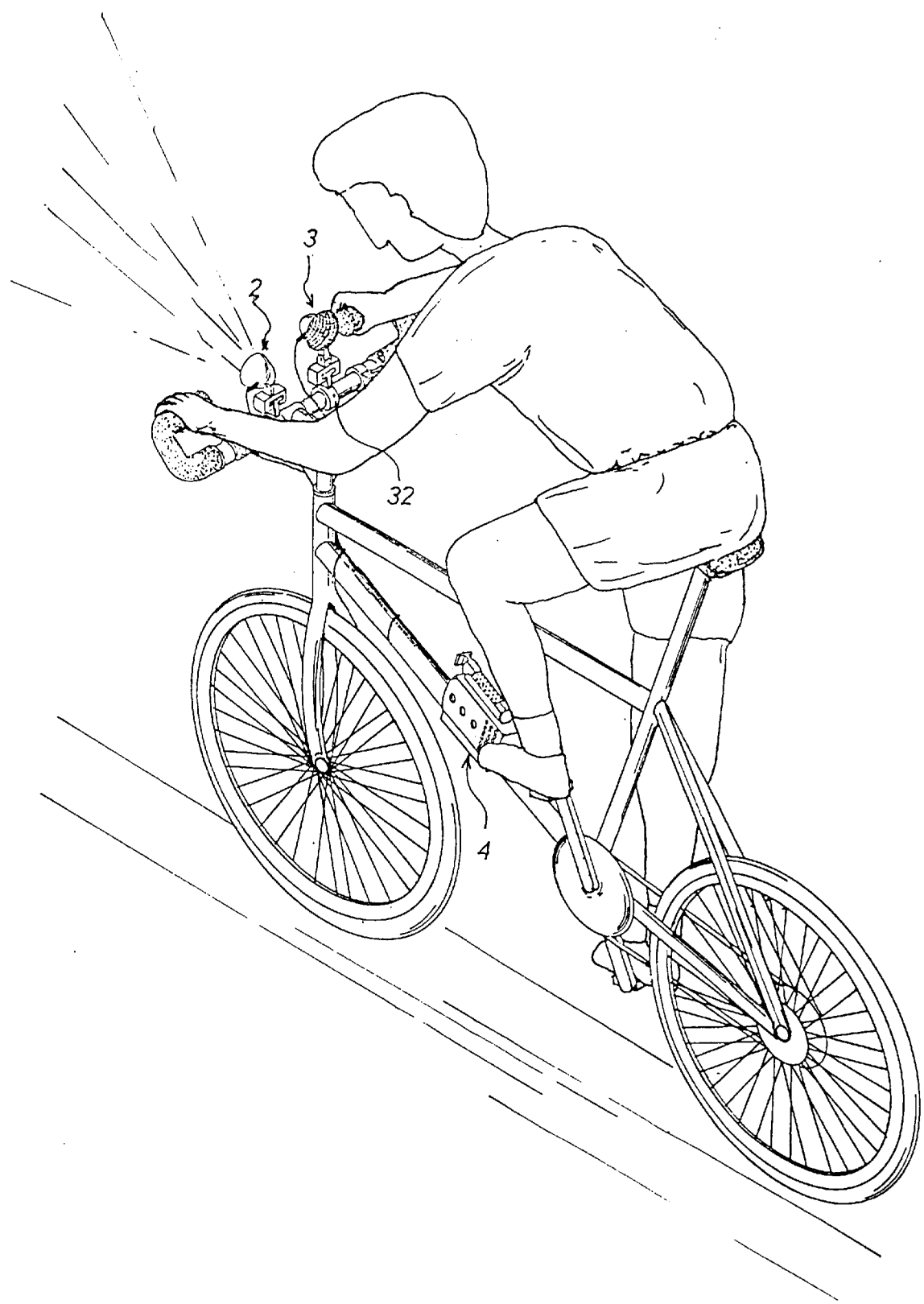
FIG. 3 is a diagram showing the present invention used as a head light of a bicycle.
Figure 4:
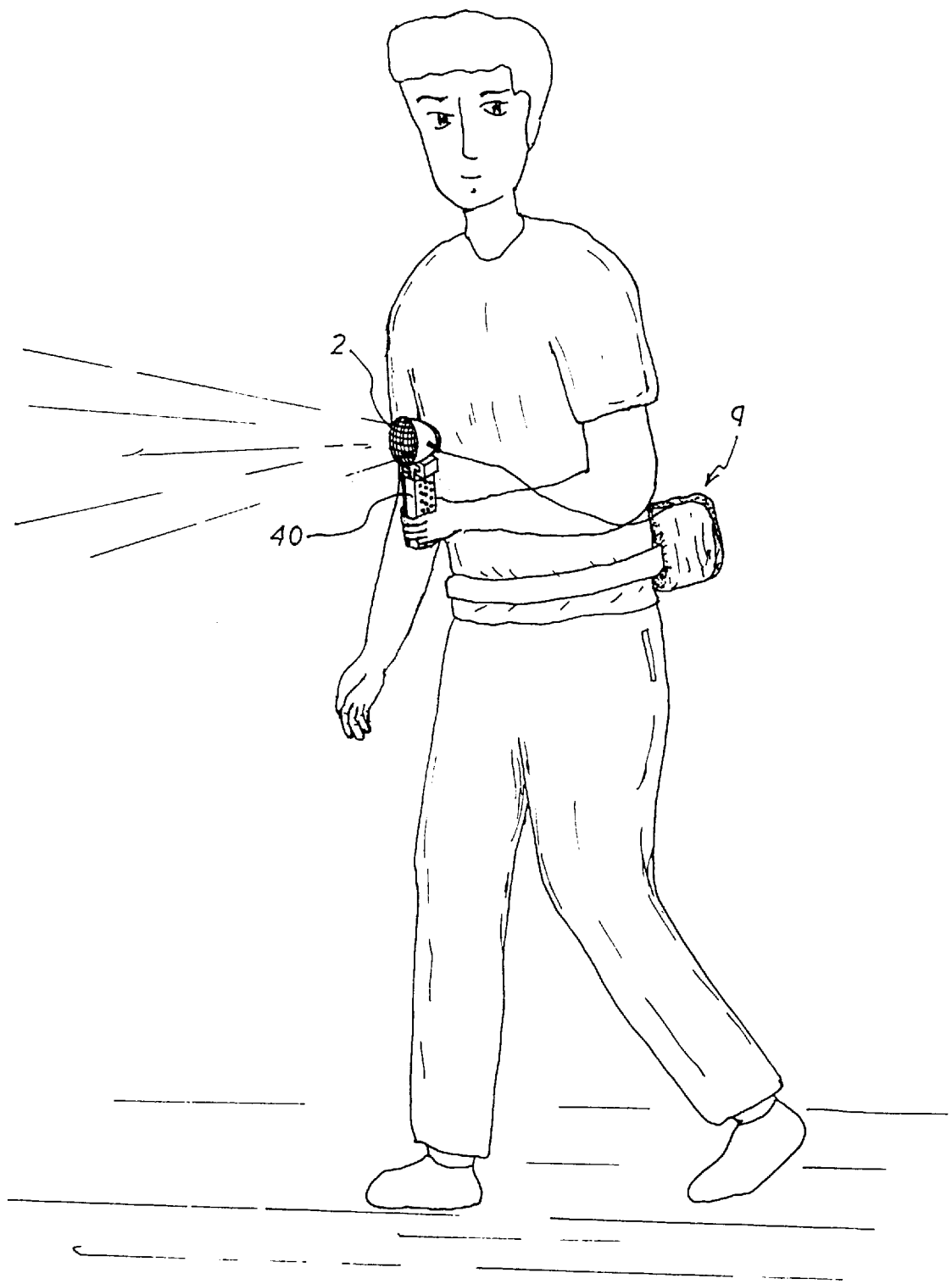
FIG. 4 is a diagram showing the present invention used as a common flash light.

In practical use, as shown in FIG. 3, the flash light 2 and the electric fan 3 controlled by the light switch 5, fan switch 6 and powered by the power supply device 4 serve as a head light and a cooling means at the same time. As further shown in FIG. 4, the power supply device 4 is dismantled from the mounting seat 1 and the electric fan 3 is removed from the fan seat 32 and engaged with the T-shaped track means 46 of the gripping handle 40 disengaged from the power supply device 4 and an electric wire 8 connects the fan 3 and the power supply device 4 so as to permit the electric fan 3 to be movable within a certain range. Moreover, the power supply device 4 can be housed in a waist bag 9 and the flash light 2 attached to the gripping handle 40 can be carried around without any restraint.

Furthermore, at a camping site, the flash light 4 and the electric fan 3 can be separately powered by power supply devices 4 so as to facilitate the campers and make the camping activity safer and easier.

I claim:

1. A flash light and electric fan in combination mounted onto a bicycle, comprising a mounting seat, a flash light, an electric fan, a light seat, a fan seat, a power supply device and a light switch and a fan switch;

said mounting seat having two screw holes in conformance to corresponding holes on a down tube of the bicycle so as to permit said mounting seat to be secured to said down tube;

said mounting seat having two symmetric tracking protrusions for engagement purpose;

said flash light having a C-shaped engagement groove defined at a bottom thereof; said groove being defined in conformance to a T-shaped track extension of said light seat secured to a front tube of the bicycle;

said electric fan having a C-shaped engagement groove defined at a bottom thereof and in conformance to a T-shaped track extension of said fan seat so as to permit said electric fan to be removably secured thereto;

said power supply device being a rechargeable battery having a charging socket and a power supply socket and having an engagement groove defined in conformance to said tracking protrusions of said mounting seat at a bottom side thereof;

a retaining groove being disposed at a top of the power supply device so as to permit a gripping handle having a notch defined at each longitudinal side thereof to be retained in engagement with said retaining groove; at a top end of the gripping handle is provided with a T-shaped track means so as to permit said flash light or said electric fan to be attached to said gripping handle and carried along with said dismantled power supply device;

said power supply device being a rechargeable battery having a charging socket and a power supply socket;

an electric wire having multiple terminals being connected to said power supply socket at one end thereof and said multiple terminals being connected respectively to said light switch, said flash light, said fan switch and said electric fan when mounted onto the bicycle;

said gripping handle being removably detached from said power supply device and said flash light or said electric fan being selectively engaged therewith so as to permit a person to carry said flash light or electric fan around by holding said gripping handle.

2. A flash light and electric fan in combination as claimed in claim 1 wherein said power supply device can be housed in a waist bag with said flash light mounted onto said gripping handle held by a person, permitting said flash light to be carried around without restraint.

* * * * *